United States Patent
Xiong et al.

(10) Patent No.: US 7,884,492 B2
(45) Date of Patent: Feb. 8, 2011

(54) METHODS AND SYSTEMS FOR WIND TURBINE GENERATORS

(75) Inventors: Qimou Xiong, Shanghai (CN); Xiang Yu, Shanghai (CN); Yu Zhou, Bejing (CN); Yingming Zhang, Shanghai (CN); David Smith, Daleville, VA (US); Giesbert Krueger, Schüttorf (DE); Andre Langel, Münster (DE)

(73) Assignee: General Electric Company, Schenectady, NY (US)

( * ) Notice: Subject to any disclaimer, the term of this patent is extended or adjusted under 35 U.S.C. 154(b) by 596 days.

(21) Appl. No.: 11/939,055

(22) Filed: Nov. 13, 2007

(65) Prior Publication Data

US 2009/0121483 A1    May 14, 2009

(51) Int. Cl.
  *F03D 9/00* (2006.01)
  *H02P 9/00* (2006.01)

(52) U.S. Cl. .......................................... 290/55; 322/44

(58) Field of Classification Search ............. 290/44, 290/55; 322/44, 59, 89; 416/1; 415/4.2, 415/4.3
  See application file for complete search history.

(56) References Cited

U.S. PATENT DOCUMENTS

| | | | |
|---|---|---|---|
| 2,106,557 A * | 1/1938 | Putnam | 290/44 |
| 3,959,719 A | 5/1976 | Espelage | |
| 3,959,720 A | 5/1976 | Bose et al. | |
| 3,982,167 A | 9/1976 | Espelage | |
| 3,982,168 A | 9/1976 | Bose et al. | |
| 5,083,039 A | 1/1992 | Richardson et al. | |
| 5,225,712 A * | 7/1993 | Erdman | 290/44 |
| 5,798,631 A | 8/1998 | Spee et al. | |
| 6,329,798 B1 | 12/2001 | Huggett et al. | |
| 6,856,038 B2 * | 2/2005 | Rebsdorf et al. | 290/44 |
| 6,856,040 B2 | 2/2005 | Feddersen et al. | |
| 6,933,625 B2 | 8/2005 | Feddersen et al. | |
| 7,015,595 B2 | 3/2006 | Feddersen et al. | |
| 7,015,597 B2 | 3/2006 | Colby et al. | |
| 7,439,714 B2 * | 10/2008 | Llorente Gonzalez et al. | 322/24 |
| 2002/0047271 A1 * | 4/2002 | Shimizu et al. | 290/40 C |
| 2006/0192390 A1 * | 8/2006 | Juanarena Saragueta et al. | 290/44 |
| 2006/0192533 A1 * | 8/2006 | Kimura et al. | 322/22 |
| 2007/0024059 A1 * | 2/2007 | D'Atre et al. | 290/44 |
| 2008/0150282 A1 * | 6/2008 | Rebsdorf et al. | 290/44 |

FOREIGN PATENT DOCUMENTS

DE          3342583 A1 *   6/1985

* cited by examiner

*Primary Examiner*—Julio Gonzalez
(74) *Attorney, Agent, or Firm*—Armstrong Teasdale LLP (57) ABSTRACT

Methods and systems for reducing heat loss in a generator system are provided. The generator system includes an electrical generator and a power converter. The method includes generating electricity in the generator at a first power factor and converting electricity in the converter at a second power factor in a first mode of operation and generating electricity in the generator at a third power factor wherein the third power factor is greater than the first power factor and converting electricity in the converter at a fourth power factor wherein the fourth power factor is less than the second power factor in a second mode of operation such that the power output of the generator system in the second mode of operation is substantially equal to the power output of the generator system in the first mode of operation and the generator currents are facilitated being reduced.

20 Claims, 5 Drawing Sheets

METHODS AND SYSTEMS FOR WIND TURBINE GENERATORS

BACKGROUND

This invention relates generally to electrical machines, and more specifically to methods and systems for controlling temperature in an electrical generator.

At least some known electrical generator systems are designed to operate within specific environmental conditions. For example at least some known wind turbine generators, are designed for sea level application with a site altitude less than approximately 1000 meters. However, such wind turbine may be installed in a location where the specific environmental conditions that are used to define the design requirements are exceeded. If the wind turbine generator is installed in a location having an altitude and/or ambient temperature that is outside the specific environmental conditions in the design criteria, the cooling capability of the wind turbine generator may be reduced and the generator may experience an over temperature condition during operation. In such a location, to maintain stable power operation of the generator without de-rating the wind turbine generator, the cooling of the generator would have to be improved.

One known solution is the implementation of an enhanced cooler, for example, a cooler having axial and/or radial cooling fans may be adopted to replace an original cooler. However, the new design of enhanced cooler and/or the design of the generator, as well as increasing the amount of electrical equipment associated with the wind turbine generator is costly. Additionally, retrofitting new equipment on an installed wind turbine generator at high heights of sixty-five meters or more is more costly.

SUMMARY

In one embodiment, a method of reducing heat loss in a generator system includes generating electricity in the generator at a first power factor and converting electricity in the converter at a second power factor in a first mode of operation and generating electricity in the generator at a third power factor wherein the third power factor is greater than the first power factor and converting electricity in the converter at a fourth power factor wherein the fourth power factor is less than the second power factor in a second mode of operation such that the power output of the generator system in the second mode of operation is substantially equal to the power output of the generator system in the first mode of operation and the generator currents are facilitated being reduced.

In another embodiment, a wind turbine generator system includes a generator including a rotor and a stator. The generator is configured to generate electricity at a first power factor in a first mode of operation and to generate electricity at a second power factor in a second mode of operation wherein the second power factor is greater than the first power factor. The wind turbine generator system also includes a power converter electrically coupled to the rotor. The power converter is configured to convert the electricity from the rotor to direct current (DC) electricity above a synchronous speed of the generator and to supply electricity to the rotor below the synchronous speed. The power converter is further configured to convert electricity at a third power factor in the first mode of operation and to convert electricity at a fourth power factor in the second mode of operation wherein the fourth power factor is less than the third power factor such that the power output of the generator system in the second mode of operation is substantially equal to the power output of the generator system in the first mode of operation and the generator currents are facilitated being reduced in the second mode of operation relative to the first mode of operation.

In yet another embodiment, a system of reducing heat loss in a wind turbine generator includes a wind turbine generator including a doubly fed induction generator wherein the generator includes a rotor for generating electricity from the rotor of the generator, a generator converter electrically coupled to the rotor wherein the converter is configured to convert the electricity from the rotor to DC electricity. The system also includes a grid side converter for converting the DC electricity to AC electricity at a selectable power factor, and at least one circuit configured to adjust the current flow of at least one of the generator converter and the grid side converter based on a temperature of the generator.

DETAILED DESCRIPTION OF THE INVENTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of controlling temperature in a wind turbine generator. However, it is contemplated that this disclosure has general application to controlling temperature in electrical machines in general and particularly machines operable with a capability of supplying or sinking reactive power.

As used herein, the term "blade" is intended to be representative of any device that provides reactive force when in motion relative to a surrounding air. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Figure 1:
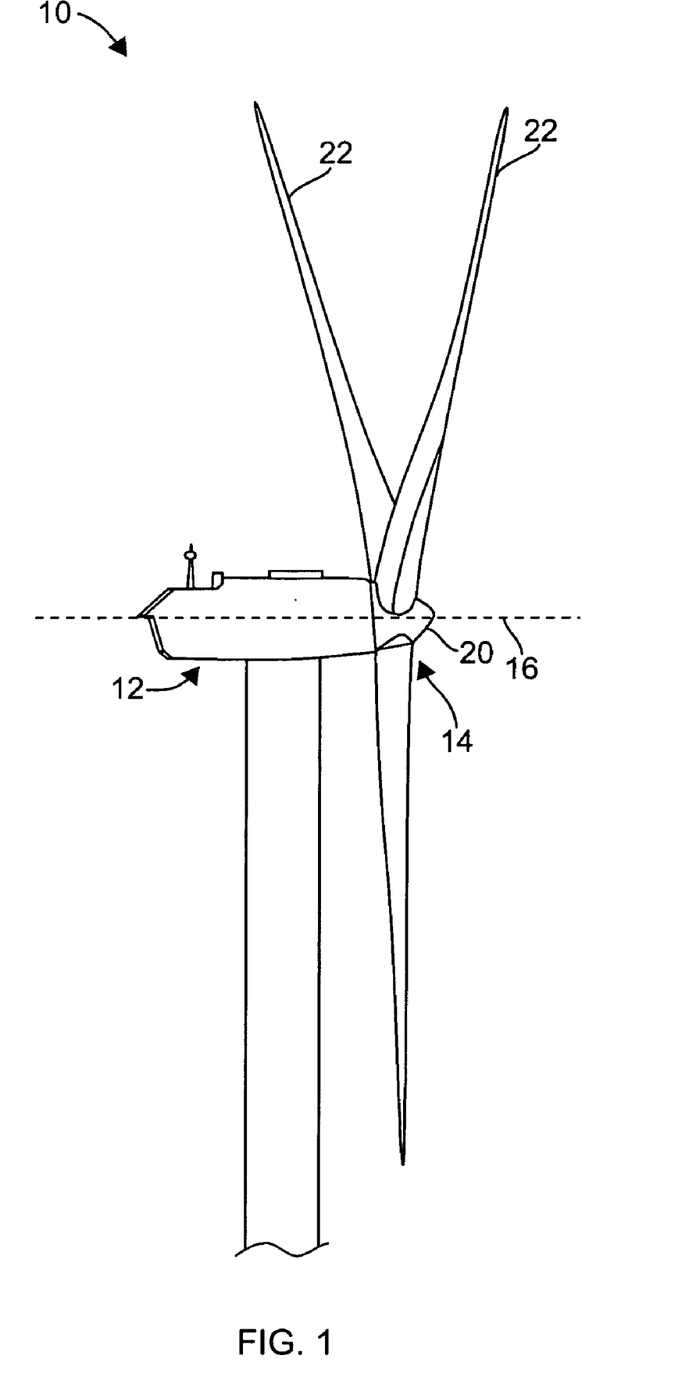
FIG. 1 is a schematic view of a wind turbine generator in accordance with an exemplary embodiment of the present invention.

FIG. 1 is a schematic view of a wind turbine generator 10 in accordance with an exemplary embodiment of the present invention. In the exemplary embodiment, wind turbine generator 10 includes a horizontal-axis configuration. Alternatively, wind turbine generator 10 may include configurations that include, but are not limited to, a vertical-axis configuration (not shown). In the exemplary embodiment, wind turbine generator 10 is electrically coupled to an electrical load (not shown in FIG. 1), such as, but not limited to, an electric power grid. The electric power grid facilitates channeling electric power therefrom to facilitate operation of wind turbine generator 10 and/or its associated components. Such associated components include electric loads that include, but are not limited to, electric-motor driven devices (for example, pitch drives), electronics (for example, control system power supplies), overhead loads (for example, lighting and heating), electric energy storage devices (for example, battery, flywheel, and capacitive storage systems) and other generators. Moreover, the electric power grid facilitates transmitting electric power generated by wind turbine generator 10. Although only one wind turbine generator 10 is illustrated, in some embodiments a plurality of wind turbines 10 may be grouped together, sometimes referred to as a "wind farm."

Wind turbine generator 10 includes a body, sometimes referred to as a "nacelle," and a rotor (generally designated by 14) coupled to nacelle 12 for rotation with respect to nacelle 12 about an axis of rotation 16. In the exemplary embodiment, nacelle 12 is mounted on a tower 18. However, in some embodiments, in addition or alternative to tower-mounted nacelle 12, wind turbine generator 10 includes a nacelle 12 adjacent the ground and/or a surface of water. The height of tower 18 may be any suitable height enabling wind turbine generator 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may have any number of blades 22. Blades 22 may each have any length and be of shape, type, and/or configuration that facilitates operation of wind turbine 10 as described herein.

Figure 2:
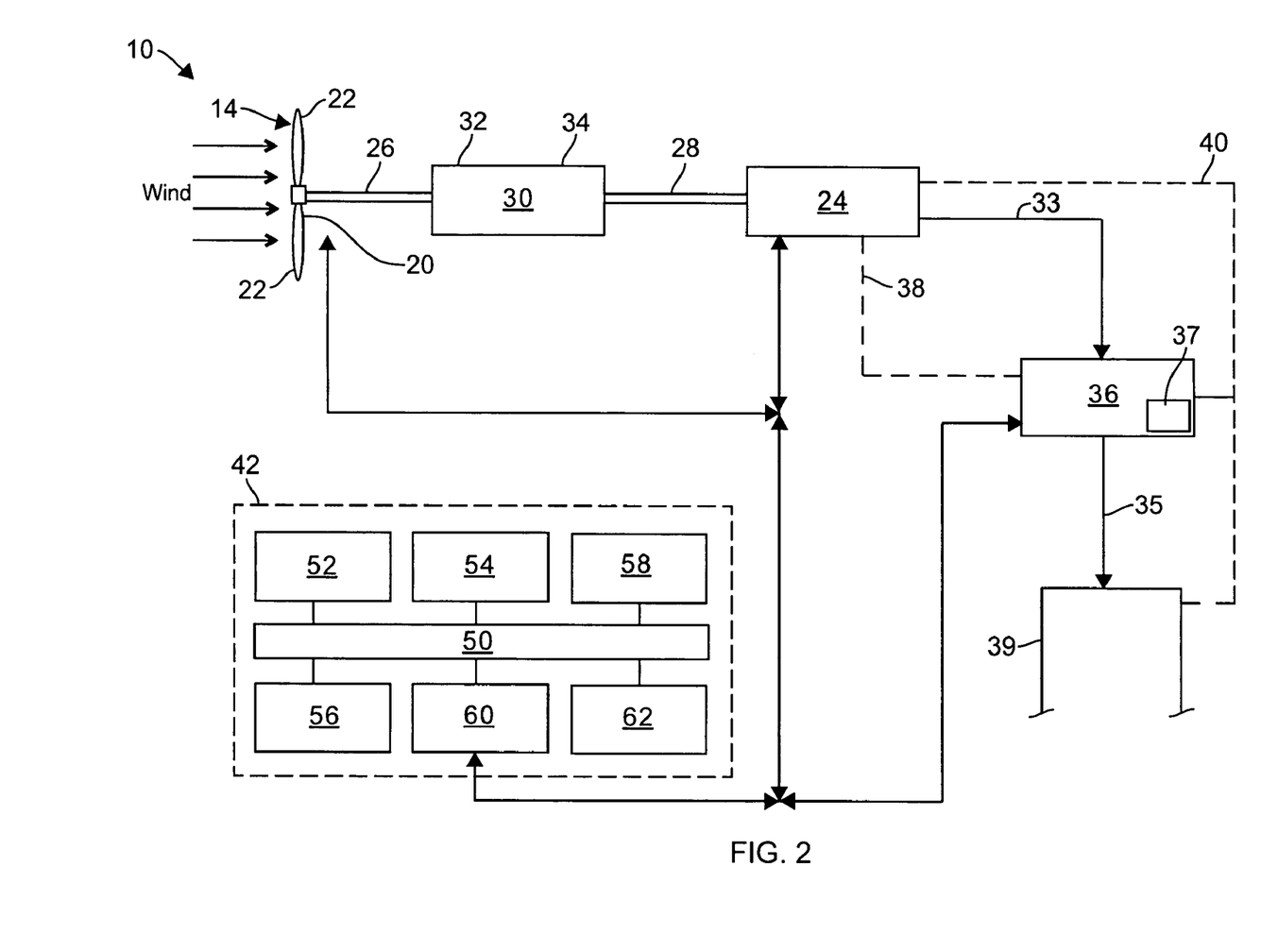
FIG. 2 is a schematic diagram of the wind turbine generator shown in FIG. 1.

FIG. 2 is a schematic diagram of wind turbine generator 10 shown in FIG. 1. Wind turbine generator 10 includes an electrical generator 24 coupled to rotor 14 for generating electrical power from the rotational energy generated by rotor 14. Generator 24 may be any suitable type of electrical generator, such as, but not limited to, a wound rotor induction generator, salient pole generator, double-sided generator, excited synchronous generator, permanent magnet generator, and/or doubly-fed induction generator (DFIG). Generator 24 includes a stator (not shown) and a rotor (not shown).

Rotor 14 includes a rotor shaft 26 coupled to rotor hub 20 for rotation therewith. Generator 24 is coupled to rotor shaft 26 such that rotation of rotor shaft 26 drives rotation of the generator rotor, and therefore operation of generator 24. In the exemplary embodiment, the generator rotor has a rotor shaft 28 coupled thereto and coupled to rotor shaft 26 such that rotation of rotor shaft 26 drives rotation of the generator rotor. In other embodiments, the generator rotor is directly coupled to rotor shaft 26, sometimes referred to as a "direct-drive wind turbine." In the exemplary embodiment, generator rotor shaft 28 is coupled to rotor shaft 26 through a gearbox 30, although in other embodiments generator rotor shaft 28 is coupled directly to rotor shaft 26. More specifically, in the exemplary embodiment gearbox 30 has a low-speed side 32 coupled to rotor shaft 26 and a high-speed side 34 coupled to generator rotor shaft 28. The torque of rotor 14 drives the generator rotor to thereby generate variable frequency alternating current (AC) electrical power from rotation of rotor 14.

In the exemplary embodiment, a frequency converter 36 is electrically coupled to generator 24 via at least one electrically conductive conduit 33. Converter 36 is configured to convert variable frequency AC electrical power received from generator 24 into fixed frequency AC electrical power for delivery to an electrical load 39, such as, but not limited to an electric power grid, electrically coupled to converter 36 via at least one electrically conductive conduit 35. In the exemplary embodiment, frequency converter 36 includes a converter reactive power support capability circuit 37 that is used to change the operational power factor of generator 24. For example, when wind turbine generator 10 is required to operate at a power factor of less than approximately 0.95. Frequency converter 36 may be located anywhere within or remote to wind turbine generator 10. For example, in the exemplary embodiment, frequency converter 36 is located within a base (not shown) of tower 18 (shown in FIG. 1).

Alternatively, frequency converter 36 is electrically coupled to generator 24 via at least one electrically conductive conduit 38 in a DFIG configuration as illustrated with dashed lines in FIG. 2. Conduit 38 is electrically coupled to generator 24 and converter 36 in lieu of conduit 33. Similarly, at least one electrically conductive conduit 40 facilitates electrically coupling generator 24 to converter 36 and load 39 in lieu of conduit 35.

In some embodiments, wind turbine generator 10 may include one or more control systems 42 coupled to one or more components of wind turbine generator 10 for generally controlling operation of wind turbine generator 10 and/or as some or all of the components thereof (whether such components are described and/or illustrated herein). In the exemplary embodiment, control system(s) 42 is mounted within nacelle 12. However, additionally or alternatively, one or more control systems 42 may be remote from nacelle 12 and/or other components of wind turbine generator 10. Control system(s) 42 may be used for, but is not limited to, overall system monitoring and control including, for example, but not limited to, pitch and speed regulation, high-speed shaft and yaw brake application, yaw and pump motor application, and/or fault monitoring. Alternative distributed or centralized control architectures may be used in some embodiments.

In the exemplary embodiment, control system(s) 42 include a bus 50 or other communications device to communicate information. One or more processor(s) 52 are coupled to bus 50 to process information. In the exemplary embodiment, processor(s) 52 are controllers. Alternatively, processor(s) 52 are any devices that facilitate operation of system 42 as described herein.

Control system(s) 42 may also include one or more random access memories (RAM) 54 and/or other storage device(s) 56. RAM(s) 54 and storage device(s) 56 are coupled to bus 50 to store and transfer information and instructions to be executed by processor(s) 52. RAM(s) 54 (and/or also storage device(s) 56, if included) can also be used to store temporary variables or other intermediate information during execution of instructions by processor(s) 52. Control system(s) 42 may also include one or more read only memories (ROM) 58 and/or other static storage devices coupled to bus 50 to store and provide static (i.e., non-changing) information and instructions to processor(s) 52. Input/output device(s) 60 may include any device known in the art to provide input data to control system(s) 42, such as, but not limited to, input and/or output data relating to frequency converter 36 and/or electrical load 39, and/or to provide outputs, such as, but not limited to, yaw control outputs, and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein.

Control system(s) 42 may also include a sensor interface 62 that allows control system(s) 42 to communicate with any sensors. Sensor interface 62 can be or can include, for example, one or more analog-to-digital converters that convert analog signals into digital signals that can be used by processor(s) 52.

In the exemplary embodiment, control system(s) 42 are coupled in electronic data communication with at least frequency converter 36, rotor 14, and generator 24 for monitoring and/or controlling operation thereof. Alternatively, control system(s) 42 is coupled in electronic data communication with electrical load 39 for receiving information relating to load 39, such as, but not limited to operational parameters and/or conditions of load 39, and/or for controlling operation of load 39.

In addition or alternatively to control system(s) 42, other control system(s) (not shown) may be used to control operation of frequency converter 36, rotor 14, generator 24, and/or load 39. Such other control system(s) include, but are not limited to, one or more control systems associated with other wind turbine generators (not shown), one or more centralized control systems for a wind farm, and/or one or more control systems associated with load 39.

Figure 3:
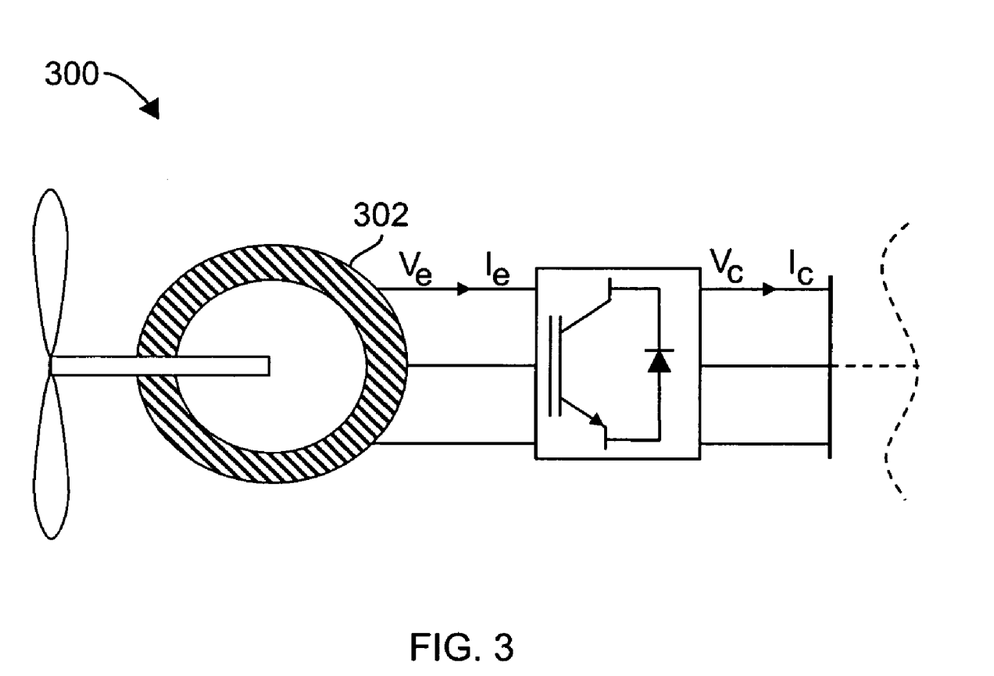
FIG. 3 is a schematic view of a variable speed wind turbine including a direct drive synchronous generator in accordance with an embodiment of the present invention.

FIG. 3 is a schematic view of a variable speed wind turbine 300 including a direct drive synchronous generator 302 in accordance with an embodiment of the present invention.

Figure 4:
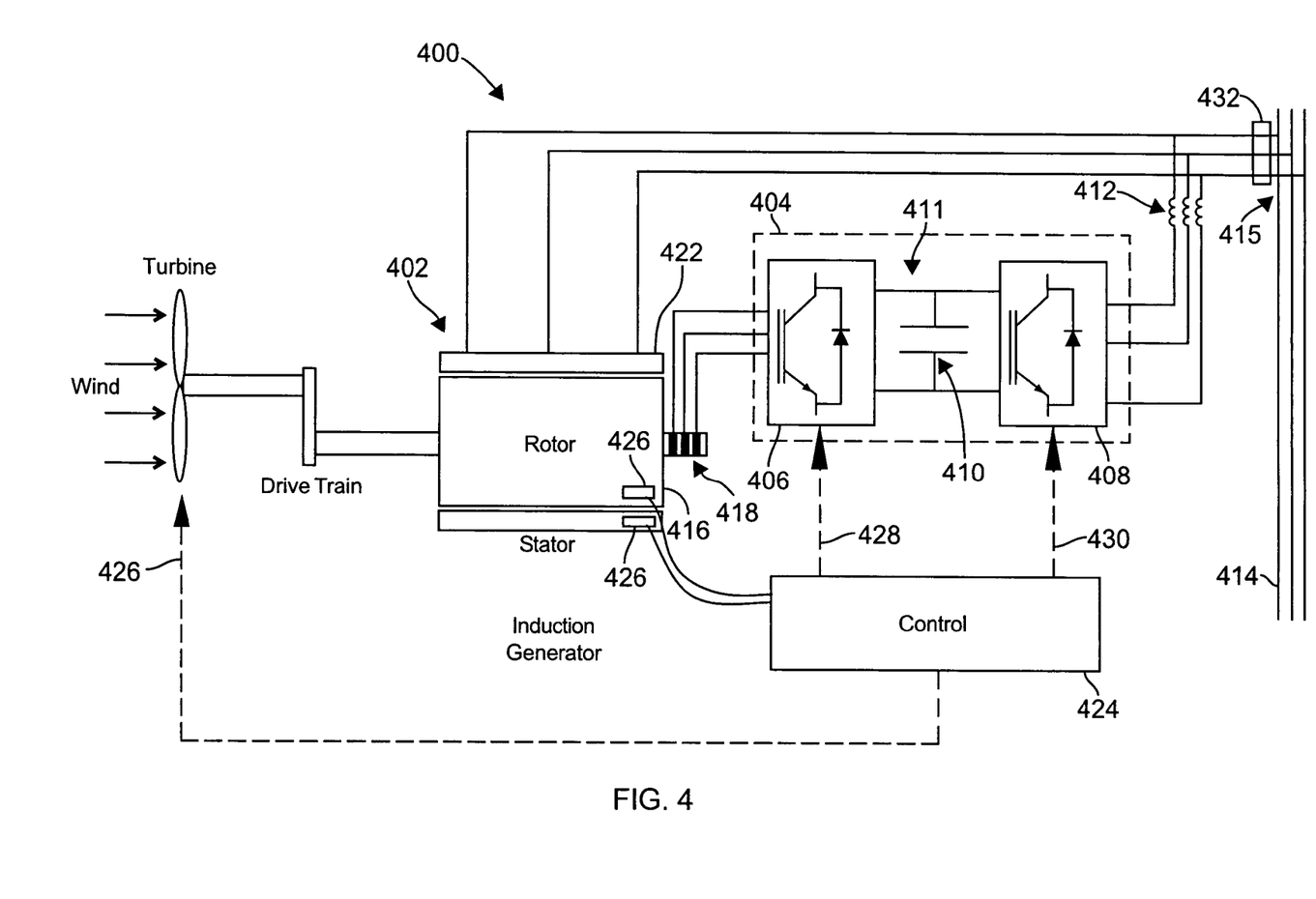
FIG. 4 is a schematic view of a variable speed wind turbine generator including a doubly fed induction generator in accordance with an embodiment of the present invention.

FIG. 4 is a schematic view of a variable speed wind turbine generator 400 including a doubly fed induction generator 402 in accordance with an embodiment of the present invention. In the exemplary embodiment, an AC/DC/AC converter 404 is divided into two components: a rotor-side converter 406 and a grid-side converter 408. Rotor-side converter 406 and a grid-side converter 408, in the exemplary embodiment, are voltage-sourced converters that use forced-commutated power electronic devices (IGBTs) to synthesize an AC voltage from a DC voltage source. A capacitor 410 coupled between conductors on a DC bus 411 acts as a DC voltage source. A coupling inductor 412 is used to couple grid-side converter 408 to a power grid 414. A three-phase rotor winding 416 is coupled to rotor-side converter 406 through respective slip rings 418 and brushes 420. The three-phase stator winding 422 is directly connected to power grid 414 through grid terminals 415. The power captured by wind turbine generator 400 is converted into electrical power by induction generator 402 and transmitted to power grid 414 by the stator and the rotor windings 422, 416. A control system 424 generates a pitch angle command 426 and a rotor-side voltage command signal 428 and a grid-side voltage command signal 430 for rotor-side converter 406 and grid-side converter 408, respectively in order to control the power of wind turbine generator 400, the DC bus 411 voltage and the reactive power or the voltage at grid terminals 415. Rotor-side converter 406 is used to control the wind turbine output power and the voltage (or reactive power) measured at grid terminals 415. Specifically, the voltage or the reactive power at grid terminals 415 is controlled by the reactive current flowing in rotor-side converter 406. In one embodiment, wind turbine generator 400 is operated in a VAR regulation mode wherein the reactive power at grid terminals 415 is maintained substantially constant using a VAR regulator (not shown). Grid-side converter 408 is used to regulate the voltage of DC bus capacitor 410. In addition, grid-side converter 408 is used to generate or absorb reactive power.

The desired power factor of the AC electricity from the stator is achieved by rotor current control. Rotor-side converter 406 is coupled to rotor windings 416 for controlling currents of rotor windings 416 to cause the electricity from stator windings 422 to be controlled to a desired power factor, and generator 402 to provide a desired torque level. The power factor of stator windings 422 may be adjusted by control system 424, which may also convert the AC electricity. The rotor electricity is supplied to DC bus 411 via rotor-side converter 406 where the DC electricity is stored in capacitor 410. In an alternative embodiment, capacitor 410 comprises a bank of capacitors.

During operation, when wind turbine generator 400 is rotating at greater than a synchronous speed of the generator, grid-side converter 408 converts the DC electricity from DC bus 411 into a constant frequency AC electricity and supplies it to power grid 414 via coupling inductor 412. When wind turbine generator 400 is rotating at less than the synchronous speed, grid-side converter 408 actively rectifies AC electricity from power grid 414 and regulates it for supplying DC electricity to rotor-side converter 406, which in turn supplies AC current to rotor windings 416. In some embodiments, the current of the AC electricity from grid-side converter 408 is adjusted to be in phase with the grid voltage such that the AC electricity from grid-side converter 408 supplied to power grid 414 is maintained substantially at unity power factor. Accordingly, AC electricity is supplied to power grid 414 from both stator windings 422 and rotor windings 416 at or above synchronous speeds of generator 402. Below synchronous speeds, AC current is supplied to rotor windings 416, and power is generated by stator windings 422 and supplied to power grid 414. Generator 402 under the control of rotor-side converter 406 adjusts the reactive power so that the AC electricity supplied by stator windings 422 is supplied at a selectively adjustable power factor. The power factor of the AC electricity provided by rotor windings 416 may be determined by current regulation via grid-side converter 408.

In the exemplary embodiment, rotor-side converter 406 is a switched inverter and provides current flow to rotor windings 416 below synchronous speed until generator 402 reaches a synchronous speed. Above synchronous speed, the generator 402 generates three-phase AC electricity from rotor windings 416 and supplies the electricity through grid-side converter 408, which then serves as an active rectifier to supply DC electricity to DC bus 411. Control system 424 controls the electricity through rotor-side converter 406 to or from rotor windings 416.

During some operations, such as at high altitudes and relatively high ambient temperatures, the installed generator cooling system (not shown) may not be efficient enough to be able to cool generator 402 to within allowable parameters. In such instances, converter reactive power support capability circuit 37 is used, which is function of converter 404 that can be used to change the operational power factor of generator 402. For example, when wind turbine generator 400 is needed to operate at a power factor of less than approximately 0.95. Normally, converter 404 does not provide reactive power to power grid 414 such as when generator 402 (stator and rotor together) operates at a power factor of less than approximately 0.95, however, using converter reactive power support capability circuit 37 the generator power factor is adjusted to, for example, 0.97 or other value, and the remainder of the reactive power requirement is supplied by grid-side converter 408. Such a transfer of the reactive power requirement from generator 402 to converter 404 facilitates reducing heat loss in generator 402 permitting full-power operation where generator 402 would have otherwise been derated or required supplemental cooling. By providing a portion of reactive power to power grid 414 from converter 404, the actual generator current values of both stator windings 422 and rotor windings 416 can be reduced, so that the heat loss is improved.

A manually entered setpoint or an automatically generated command may be used to select a power factor setting that will reduce rotor reactive currents. A temperature sensor 426 or sensors (not shown) embedded in rotor windings 416 and/or stator windings 422 may be used to facilitate determining when cooling of generator 402 is insufficient and the converter reactive power support capability circuit 37 should be used. Temperature sensor 426 may be coupled to control system 424 such that an algorithm executing on control system 424 may determine the power factor setting needed to reduce current flow, which may be selected or generated and transmitted to rotor-side converter 406. The setting is the determined rotor current supplied to rotor windings 416 to cause generator 402 to generate the electricity from its stator at the desired power factor. Using converter 404 reactive power support capability to provide a portion of the reactive power requirement that is shifted from generator 402 to power grid 414 facilitates reducing generator stator and rotor currents such that heat loss in generator 402 is improved and the operational temperature of stator windings 422 are reduced.

In an alternative embodiment, one or more capacitors 432 are coupled to an output of turbine 404 to provide reactive power outside of generator 402, for example, a fixed value of capacitance and/or capacitance regulated from for example, approximately 0.95 overexcited as the normal point to approximately 0.95 underexcited by running the generator between 1 and 0.9 overexcited. Additional capacitors would also provide for a shift of reactive power from generator 402 such that stator and rotor winding currents are reduced at less cost than an additional cooling retrofit.

Figure 5A:
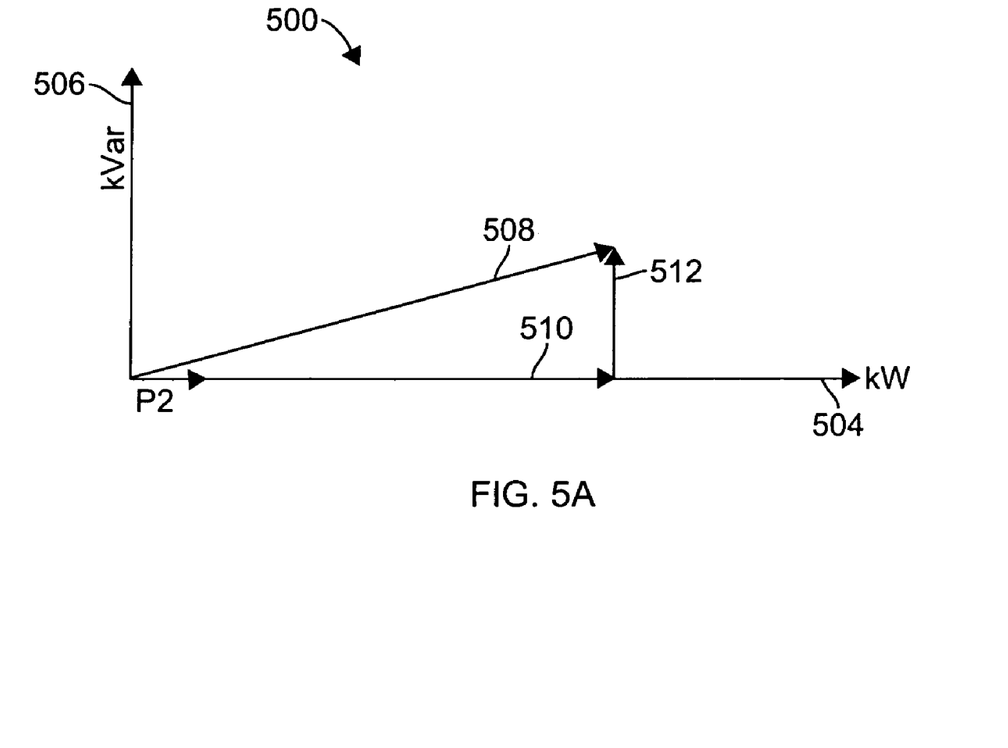
FIG. 5A is a graph illustrating output power from wind turbine generator to power grid.
Figure 5B:
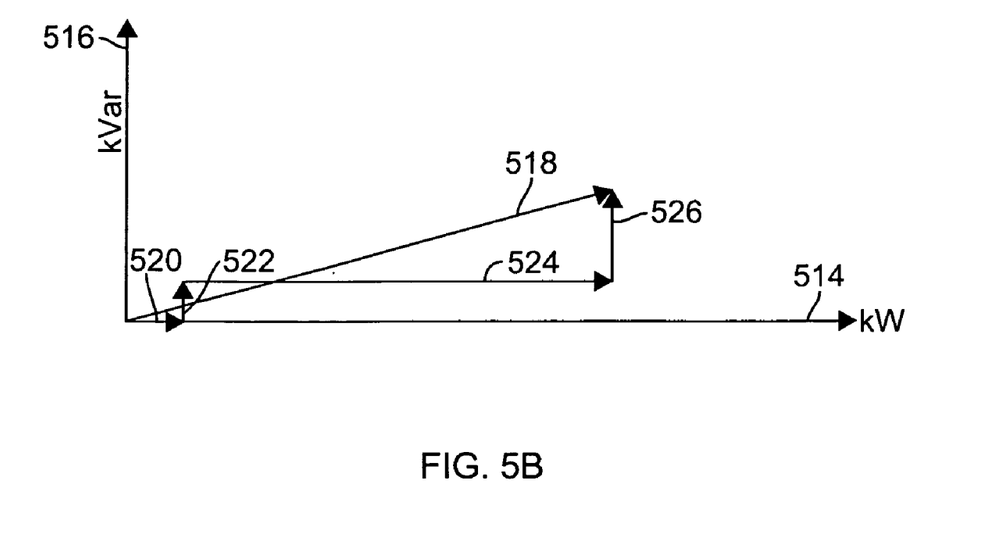
FIG. 5B is a graph illustrating output power from wind turbine generator to power grid using converter to supply a portion of the reactive load to the grid.

FIG. 5A is a graph 500 illustrating output power from wind turbine generator 400 to power grid 414. FIG. 5B is a graph 502 illustrating output power from wind turbine generator 10 to power grid 414 using converter 404 to supply a portion of the reactive load to the grid. In the exemplary embodiment, graph 500 includes an x-axis 504 graduated in units of real power, for example, kilowatts and a y-axis 506 graduated in units of reactive power, for example, kilovars. A first vector 508 illustrates the apparent power supplied to grid 414 from wind turbine generator 400. Vector 508 comprises a real component 510 and a reactive component 512, both supplied by generator 402. In the exemplary embodiment, graph 502 includes an x-axis 514 graduated in units of real power, for example, kilowatts and a y-axis 516 graduated in units of reactive power, for example, kilovars. A second vector 518 illustrates the apparent power supplied to grid 414 from wind turbine generator 400 using converter 404 to supply at least a portion of the reactive load to grid 414. Vector 518 comprises a real component 520 supplied by converter 404 and a reactive component 522 also supplied by converter 404. Vector 518 also comprises a real component 524 and a reactive component 526 both supplied by generator 402. In each case illustrated in FIGS. 5A and 5B, the power factor supplied to the grid is approximately 0.95, however, as illustrated in FIG. 5B, using the converter reactive power support capability circuit 37 of converter 404 permits shifting reactive load from generator 402 to converter 404 to facilitate reducing currents in generator 402, which lessens the cooling requirement of generator 402. By using the converter reactive power support capability circuit 37 feature instead of adding a supplemental cooling system, wind turbine generator 10 is capable of operating in high altitude and/or high temperature environments.

As will be appreciated and based on the foregoing specification, the above-described embodiments of the disclosure may be implemented using computer programming or engineering techniques including computer software, firmware, hardware or any combination or subset thereof, wherein the technical effect is sharing of reactive load between a wind turbine generator and a power converter to reduce generator currents for facilitating reducing generator cooling loss. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

While embodiments of the disclosure have been described in terms of various specific embodiments, it will be recognized that the embodiments of the disclosure can be practiced with modification within the spirit and scope of the claims.

What is claimed is:

1. A method for reducing heat loss in a generator system that includes an electrical generator and a power converter, said method comprising:

generating electricity in the generator at a first power factor and converting electricity in the converter at a second power factor in a first mode of operation; and generating electricity in the generator at a third power factor wherein the third power factor is greater than the first power factor and converting electricity in the converter at a fourth power factor wherein the fourth power factor is less than the second power factor in a second mode of operation such that the power output of the generator system in the second mode of operation is substantially equal to the power output of the generator system in the first mode of operation and the generator currents are facilitated being reduced.

2. A method in accordance with claim 1 further comprising supplying the electricity to a utility grid at a substantially constant frequency and a substantially unity power factor.

3. A method in accordance with claim 1 further comprising selecting the second mode of operation based on an environment where the generator system is installed.

4. A method in accordance with claim 1 further comprising:

monitoring a temperature of at least one of a rotor winding of the generator and a stator winding of the generator; and selecting the second mode of operation based on the temperature of the at least one of the rotor winding and the stator winding exceeding a predetermined range.

5. A method in accordance with claim 4 wherein monitoring a temperature of at least one of a rotor winding of the generator and a stator winding of the generator comprises deriving a value of a parameter that is equivalent to the temperature of at least one of a rotor winding of the generator and a stator winding.

6. A method in accordance with claim 1 further comprising coupling a fixed capacitive reactance to an output of the generator.

7. A method in accordance with claim 1 further comprising coupling a variable capacitive reactance to an output of the generator.

8. A wind turbine generator system comprising:
a generator comprising a rotor and a stator, said generator configured to generate electricity at a first power factor in a first mode of operation and to generate electricity at a second power factor in a second mode of operation wherein the second power factor is greater than the first power factor; and
a power converter electrically coupled to the rotor, said power converter configured to convert the electricity from the rotor to direct current (DC) electricity above a synchronous speed of the generator, said power converter configured supply electricity to the rotor below the synchronous speed, said power converter further configured to convert electricity at a third power factor in the first mode of operation and to convert electricity at a fourth power factor in the second mode of operation wherein the fourth power factor is less than the third power factor such that the power output of the generator system in the second mode of operation is substantially equal to the power output of the generator system in the first mode of operation and the generator currents are facilitated being reduced in the second mode of operation relative to the first mode of operation.

9. A system in accordance with claim 8 wherein reactive generator currents are facilitated being reduced in the second mode of operation relative to the first mode of operation.

10. A system in accordance with claim 8 further comprising a capacitive reactance electrically coupled to an output of the generator.

11. A system in accordance with claim 8 further comprising a variable capacitive reactance to an output of the generator.

12. A system in accordance with claim 8 further comprising supplying electricity to a power grid at substantially unity power factor.

13. A system in accordance with claim 8 further comprising a converter reactive power support capability circuit configured to selectively adjust a reactive power contribution of the converter to the output of the wind turbine generator system.

14. A system in accordance with claim 8 further comprising a converter reactive power support capability circuit configured to selectively control a current of the generator rotor to control a reactive power output of the generator.

15. A system in accordance with claim 8 wherein said converter comprises a rotor-side converter coupled to a grid-side converter through a direct current (DC) bus wherein said converter reactive power support capability circuit configured to selectively control the at least one of the rotor-side converter and the grid-side converter to control reactive current of the generator.

16. A system in accordance with claim 8 wherein said converter comprises a rotor-side converter coupled to a grid-side converter through a direct current (DC) bus that includes a DC source coupled thereto.

17. A system in accordance with claim 16 wherein said DC source comprises at least one of a capacitor, a supercapacitor, and a battery.

18. A system of reducing heat loss in a wind turbine generator, said system comprising:
a wind turbine generator comprising a doubly fed induction generator, said generator comprising a rotor for generating electricity from the rotor of the generator, said generator configured to generate electricity at a first power factor in a first mode of operation and to generate electricity at a second power factor in a second mode of operation wherein the second power factor is greater than the first power factor;
a generator converter electrically coupled to said rotor, said converter configured to convert the electricity from the rotor to DC electricity;
a grid side converter for converting the DC electricity to AC electricity at a selectable power factor; and
at least one circuit configured to adjust the current flow of at least one of the generator converter and the grid side converter, said at least one circuit is further configured to convert electricity at a third power factor in the first mode of operation and to convert electricity at a fourth power factor in the second mode of operation wherein the fourth power factor is less than the third power factor such that the power output of the wind turbine generator in the second mode of operation is substantially equal to the power output of the wind turbine generator in the first mode of operation.

19. A system in accordance with claim 18 wherein said generator comprises a rotor winding and a stator winding and wherein said at least one circuit is configured to adjust the current flow of at least one of the generator converter and the grid side converter based on a temperature of at least one of the rotor winding and the stator winding.

20. A system in accordance with claim 18 further comprising a circuit configured to at least one of measure the temperature of the generator and derive the temperature of the generator using process parameters of the wind turbine generator.

* * * * *